(12) United States Patent
Takamatsu et al.

(10) Patent No.: US 8,442,699 B2
(45) Date of Patent: May 14, 2013

(54) VEHICLE INTEGRATED CONTROL SYSTEM

(75) Inventors: Hideki Takamatsu, Anjo (JP); Masanori Hirose, Brussels (BE); Hiroshi Mizuno, Toyota (JP); Yoshiyuki Hashimoto, Nishikamo-gum (JP); Hirotada Otake, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1565 days.

(21) Appl. No.: 10/583,156

(22) PCT Filed: Nov. 30, 2004

(86) PCT No.: PCT/JP2004/018226
§ 371 (c)(1),
(2), (4) Date: Jun. 16, 2006

(87) PCT Pub. No.: WO2005/061267
PCT Pub. Date: Jul. 7, 2005

(65) Prior Publication Data
US 2007/0150118 A1    Jun. 28, 2007

(30) Foreign Application Priority Data
Dec. 19, 2003  (JP) .................................. 2003-423510

(51) Int. Cl.
*G06F 19/00* (2011.01)
*B60T 7/12* (2011.01)

(52) U.S. Cl.
USPC ........ 701/1; 701/36; 701/51; 701/58; 701/70; 701/71; 701/75; 701/78; 701/83; 701/84; 701/91; 701/93; 701/99; 701/101; 701/102

(58) Field of Classification Search .................. None
See application file for complete search history.

(56) References Cited

U.S. PATENT DOCUMENTS 5,351,776 A * 10/1994 Keller et al. .................... 701/70
5,408,411 A * 4/1995 Nakamura et al. ............ 701/48
5,925,082 A * 7/1999 Shimizu et al. ................ 701/41
(Continued)

FOREIGN PATENT DOCUMENTS
EP    0 507 072 A2    10/1992
GB    2 318 106 A     4/1998
(Continued)

OTHER PUBLICATIONS

Harata et al.; "A simplified serial communication network within a vehicle"; IEEE; May 1, 1989; pp. 437-442; XP010086161.

(Continued)

*Primary Examiner* — Jonathan M Dager
(74) *Attorney, Agent, or Firm* — Oliff & Berridge, PLC

(57) ABSTRACT

An integrated control system includes a main control system controlling a driving system, a main control system controlling a brake system, and a main control system controlling a steering system, an adviser unit generating and providing information to be used at each control system based on environmental information around the vehicle or information related to a driver, an agent unit generating and providing information to be used at each of the main control systems to cause the vehicle to realize a predetermined behavior, and a supporter unit generating and providing information to be used at each of the main control systems based on the current dynamic state of the vehicle.

24 Claims, 10 Drawing Sheets

U.S. PATENT DOCUMENTS

| | | | |
|---|---|---|---|
| 5,991,669 A * | 11/1999 | Dominke et al. | 701/1 |
| 6,038,505 A * | 3/2000 | Probst et al. | 701/65 |
| 6,154,688 A * | 11/2000 | Dominke et al. | 701/1 |
| 6,360,152 B1 * | 3/2002 | Ishibashi et al. | 701/48 |
| 6,397,282 B1 * | 5/2002 | Hashimoto et al. | 710/260 |
| 6,675,081 B2 * | 1/2004 | Shuman et al. | 701/48 |
| 6,862,508 B2 * | 3/2005 | Akiyama et al. | 701/48 |
| 7,840,318 B2 * | 11/2010 | Bremsjo | 701/21 |
| 2001/0027368 A1 | 10/2001 | Minowa et al. | 701/70 |
| 2002/0016659 A1 * | 2/2002 | Tashiro et al. | 701/48 |
| 2002/0055811 A1 * | 5/2002 | Obradovich | 701/23 |
| 2003/0225495 A1 * | 12/2003 | Coelingh et al. | 701/48 |
| 2004/0044443 A1 * | 3/2004 | Eriksson | 701/1 |
| 2004/0090195 A1 | 5/2004 | Motsenbocker | 318/109 |
| 2005/0137766 A1 * | 6/2005 | Miyakoshi et al. | 701/36 |
| 2005/0137769 A1 * | 6/2005 | Takamatsu et al. | 701/48 |
| 2005/0143893 A1 * | 6/2005 | Takamatsu et al. | 701/91 |
| 2005/0154506 A1 * | 7/2005 | Takamatsu | 701/1 |
| 2005/0240319 A1 * | 10/2005 | Sawada | 701/1 |
| 2007/0142987 A1 * | 6/2007 | Takamatsu et al. | 701/41 |
| 2008/0306665 A1 * | 12/2008 | Wheals | 701/59 |

FOREIGN PATENT DOCUMENTS

| | | |
|---|---|---|
| JP | A 05-085228 | 4/1993 |
| JP | A-2002-036919 | 2/2002 |
| JP | A-2002-347479 | 12/2002 |
| JP | A 2003-191774 | 7/2003 |
| RU | 2 117 976 C1 | 8/1998 |

OTHER PUBLICATIONS

Japanese Office Action issued Apr. 20, 2010 in Application No. 2003-423510 with English translation.

* cited by examiner

VEHICLE INTEGRATED CONTROL SYSTEM

TECHNICAL FIELD

The present invention relates to a system controlling a plurality of actuators incorporated in a vehicle, and more particularly, a system controlling in an integrated manner a plurality of actuators with the possibility of mutual interference.

BACKGROUND ART

There has been an increasing trend in recent years towards incorporating many types of motion control devices in the same vehicle to control the motion of the vehicle. The effect produced by each of the different types of motion control devices may not always emerge in a manner independent of each other at the vehicle. There is a possibility of mutual interference. It is therefore important to sufficiently organize the interaction and coordination between respective motion control devices in developing a vehicle that incorporates a plurality of types of motion control devices.

For example, when it is required to incorporate a plurality of types of motion control devices in one vehicle in the development stage of a vehicle, it is possible to develop respective motion control devices independently of each other, and then implement the interaction and coordination between respective motion control devices in a supplemental or additional manner.

In the case of developing a plurality of types of motion control devices in the aforesaid manner, organization of the interaction and coordination between respective motion control devices requires much time and effort.

With regards to the scheme of incorporating a plurality of types of motion control devices in a vehicle, there is known the scheme of sharing the same actuator among the motion control devices. This scheme involves the problem of how the contention among the plurality of motion control devices, when required to operate the same actuator at the same time, is to be resolved.

In the above-described case where the interaction and coordination among a plurality of motion control devices are to be organized in a supplemental or additional manner after the motion control devices are developed independently of each other, it is difficult to solve the problem set forth above proficiently. In practice, the problem may be accommodated only by selecting an appropriate one of the plurality of motion control devices with precedence over the others, and dedicate the actuator to the selected motion control device alone.

An approach related to the problem set forth above in a vehicle incorporating a plurality of actuators to drive a vehicle in the desired behavior is disclosed in the following publications.

Japanese Patent Laying-Open No. 5-85228 (Document 1) discloses an electronic control system of a vehicle that can reduce the time required for development, and that can improve the reliability, usability, and maintenance feasibility of the vehicle. This electronic control system for a vehicle includes elements coacting for carrying out control tasks with reference to engine power, drive power and braking operation, and elements for coordinating the coaction of the elements to effect a control of operating performance of the motor vehicle in correspondence to a request of the driver. Respective elements are arranged in the form of a plurality of hierarchical levels. At least one of the coordinating elements of the hierarchical level is adapted for acting on the element of the next hierarchical level when translating the request of the driver into a corresponding operating performance of the motor vehicle thereby acting on a pre-given subordinate system of the driver-vehicle system while providing the performance required from the hierarchical level for this subordinate system.

By organizing the entire system in a hierarchy configuration in accordance with this electronic control system for a vehicle, an instruction can be conveyed only in the direction from an upper level to a lower level. The instruction to execute the driver's request is transmitted in this direction. Accordingly, a comprehensible structure of elements independent of each other is achieved. The linkage of individual systems can be reduced to a considerable level. The independency of respective elements allows the individual elements to be developed concurrently at the same time. Therefore, each element can be developed in accordance with a predetermined object. Only a few interfaces with respect to the higher hierarchical level and a small number of interfaces for the lower hierarchical level have to be taken into account. Accordingly, optimization of the totality of the driver and the vehicle electronic control system with respect to energy consumption, environmental compatibility, safety and comfort can be achieved. As a result, a vehicle electronic control system can be provided, allowing reduction in the development time, and improvement in reliability, usability, and maintenance feasibility of a vehicle.

Japanese Patent Laying-Open No. 2003-191774 (Document 2) discloses a integrated type vehicle motion control device adapting in a hierarchy manner a software configuration for a device that controls a plurality of actuators in an integrated manner to execute motion control of a plurality of different types in a vehicle, whereby the hierarchy structure is optimized from the standpoint of practical usage. This integrated vehicle motion control device controls a plurality of actuators in an integrated manner through a computer based on information related to driving a vehicle by a driver to execute a plurality of types of vehicle motion control for the vehicle. At least the software configuration among the hardware configuration and software configuration includes a plurality of elements organized in hierarchy in a direction from the driver towards the plurality of actuators. The plurality of elements include: (a) a control unit determining the target vehicle state quantity based on the driving-related information at the higher level; and (b) an execution unit receiving the determined target vehicle state quantity as an instruction from the control unit to execute the received instruction via at least one of the plurality of actuators at the lower level. The control unit includes an upper level control unit and a lower level control unit, each issuing an instruction to control the plurality of actuators in an integrated manner. The upper level control unit determines a first target vehicle state quantity based on the driving-related information without taking into account the dynamic behavior of the vehicle, and supplies the determined first target vehicle state quantity to the lower level control unit. The lower level control unit determines the second target vehicle state quantity based on the first target vehicle state quantity received from the upper level control unit, taking into account the dynamic behavior of the vehicle, and supplies the determined second target vehicle state quantity to the execution unit. Each of the upper level control unit, the lower level control unit, and the execution unit causes the computer to execute a plurality of modules independent of each other on the software configuration to realize unique functions thereof.

In accordance with this integrated type vehicle motion control device, at least the software configuration among the hardware configuration and software configuration is organized in a hierarchy structure so as to include: (a) a control unit determining a target vehicle state quantity based on driving-related information at the higher level in the direction from the driver to the plurality of actuators; and (b) an execution unit receiving the determined target vehicle state quantity as an instruction from the control unit to execute the received instruction via at least one of the plurality of actuators at the lower level. In other words, at least the software configuration is organized in hierarchal levels such that the control unit and the execution unit are separated from each other in this vehicle motion control device. Since the control unit and the execution unit are independent of each other from the software configuration perspective, respective stages of development, designing, design modification, debugging and the like can be effected without influencing the other. Respective stages can be carried out concurrently with each other. As a result, the period of the working stage required for the entire software configuration can be readily shortened by the integrated vehicle motion control device.

The electronic control system for a vehicle disclosed in Document 1 is disadvantageous in that the entire controllability of the vehicle is degraded when in the event of system failure at the upper hierarchical level since the entire system employs a hierarchy structure.

The integrated type vehicle motion control device disclosed in Document 2 specifically discloses the hierarchy structure of Document 1, and is directed to optimization of the hierarchy structure from the standpoint of practical usage. Specifically, the software configuration is divided into at least a control unit and an execution unit, independent of each other in the hierarchy level. Although this integrated type vehicle motion control device is advantageous from the standpoint of concurrent processing of development by virtue of independency thereof, the issue of depending upon the basic concept of hierarchy is not yet resolved.

DISCLOSURE OF THE INVENTION

In view of the foregoing, an object of the present invention is to provide a vehicle integrated control system having the fail-safe faculty improved and capable of readily accommodating addition of a vehicle control function, based on integrated control, without realizing the entire control of the vehicle by, for example, one master ECU (electronic control unit) as in the conventional case.

According to an aspect of the present invention, a vehicle integrated control system includes a plurality of control units operating autonomously for controlling the running state of a vehicle based on a manipulation request. Each control unit includes a sensing unit for sensing an operation request with respect to at least one control unit, and a controller generating a control target based on the sensed request for controlling the vehicle by manipulating an actuator set in correspondence with each unit using the control target. The system further includes a processing unit operating parallel to respective control units to generate information used to modify, as necessary, the operation request or control target at each control unit and provide the generated information to respective control units.

According to the present invention, the plurality of control units include, for example, one of a driving system control unit, a brake system control unit, and a steering system control unit. The driving system control unit senses an accelerator pedal manipulation that is a request of a driver through the sensing unit to generate a control target of the driving system corresponding to the accelerator pedal manipulation using a driving basic driver model, whereby a power train that is an actuator is controlled by the controller. The brake system control unit senses a brake pedal manipulation that is a request of the driver through the sensing unit to generate a control target of the control system corresponding to the brake pedal manipulation using a brake basic driver model, whereby a brake device that is an actuator is controlled by the controller. The steering system control unit senses a steering manipulation that is a request of the driver through the sensing unit to generate a control target of the steering system corresponding to the steering manipulation using a steering basic driver model, whereby a steering device that is an actuator is controlled by the controller. The vehicle integrated control system includes a processing unit that operates parallel to the driving system control unit, brake system control unit and steering system control unit that operate autonomously. For example, the processing unit generates: 1) information to be used at respective controllers based on the environmental information around the vehicle or information related to the driver, and provides the generated information to respective control units; 2) information to be used at respective controllers to cause the vehicle to realize a predetermined behavior, and provides the generated information to respective control units; and 3) information to be used at respective controllers based on the current dynamic state of the vehicle, and provides the generated information to respective control units. Each control unit determines as to whether or not such input information, in addition to the driver's request from the processing unit, is to be reflected in the motion control of the vehicle, and to what extent, if to be reflected. Each control unit also corrects the control target, and transmits the information among respective control units. Since each control unit operates autonomously, the power train, brake device and steering device are controlled eventually at respective control units based on the eventual driving target, braking target and steering target calculated from the driver's manipulation information sensed by the sensing unit, the information input from the processing unit, and information transmitted among respective control units. Thus, the driving system control unit corresponding to a "running" operation that is the basic operation of the vehicle, the brake system control unit corresponding to a "stop" operation, and the steering system control unit corresponding to a "turning" operation are provided operable in a manner independent of each other. The processing unit is applied with respect to these control units such that the driving operation corresponding to the vehicle environment, driving support for the driver, and vehicle dynamic motion control can be conducted automatically in a parallel manner. Accordingly, decentralized control is allowed without a master control unit that is positioned at a higher level than the other control units, and the fail safe faculty can be improved. Furthermore, by virtue of autonomous operation, development is allowed on the basis of each control unit or each processing unit. In the case where a new driving support function is to be added, the new function can be implemented by just adding a processing unit or modifying an existing processing unit. As a result, a vehicle integrated control system can be provided, having the fail-safe performance improved and capable of readily accommodating addition of a vehicle control function, based on integrated control, without realizing the entire control of the vehicle by, for example, one master ECU as in the conventional case.

According to another aspect of the present invention, a vehicle integrated control system includes a plurality of control units controlling a running state of a vehicle based on a manipulation request, and a processing unit generating information to be used at respective control units based on environmental information around the vehicle or information related to the driver, and providing the generated information to respective control units. Each control unit includes a sensing unit for sensing an operation request with respect to at least one control unit, and a calculation unit for calculating information related to a control target to operate an actuator set in correspondence with each unit using at least one of the information generated by the processing unit and the sensed operation request.

In accordance with the present invention, the driving system control unit senses an accelerator pedal manipulation that is a request of a driver through the sensing unit to generate a control target of the driving system corresponding to the accelerator pedal manipulation using a driving basic driver model, whereby the power train that is an actuator is controlled by the controller. The brake system control unit senses a brake pedal manipulation that is a request of the driver through the sensing unit to generate a control target of the brake system corresponding to the brake pedal manipulation using a brake basic driver model, whereby the brake device that is an actuator is controlled by the controller. The steering system control unit senses a steering manipulation that is a request of the driver through the sensing unit to generate a control target of the steering system corresponding to the steering manipulation using a steering basic driver model, whereby a steering device that is an actuator is controlled by the controller. Such a vehicle integrated control system that operates autonomously includes a processing unit that operates parallel to the driving system control unit, brake system control unit and steering system control unit that operate autonomously. This processing unit generates information to be used at respective controllers based on the environmental information around the vehicle or information related to the driver, and provides the generated information to respective control units. For example, the processing unit generates information representing the degree of risk with respect to the vehicle operation property based on the frictional resistance (µ value) of the road on which the vehicle is running, the outdoor temperature and the like as the environmental information around the vehicle, and/or generates information representing the degree of risk with respect to the manipulation of the driver based on the fatigue level of the driver upon shooting a picture of the driver. Information representing the degree of risk is output to respective control units. Each control unit determines as to whether or not such input information, in addition to the driver's request from the processing unit, is to be reflected in the motion control of the vehicle, and to what extent, if to be reflected. At this stage, the control target is corrected, and information is transmitted among respective control units. Since each control unit operates autonomously, the power train, brake device and steering device are controlled eventually at respective control units based on the eventual driving target, braking target and steering target calculated from the driver's manipulation information sensed by the sensing unit, the information input from the processing unit, and information transmitted among respective control units. Thus, the driving system control unit corresponding to a "running" operation that is the basic operation of the vehicle, the brake system control unit corresponding to a "stop" operation, and the steering system control unit corresponding to a "turning" operation are provided operable in a manner independent of each other. The processing unit is applied with respect to these control units such that information related to risk and stability of environmental information around the vehicle and information related to the driver is generated and provided to respective control units. Therefore, a vehicle integrated control system can be provided that can readily accommodate motion control of high level based on the addition of environmental information around the vehicle and information of the driver.

According to a further aspect of the present invention, a vehicle integrated control system includes a plurality of control units controlling a running state of a vehicle based on a manipulation request, and a processing unit generating information to be used at respective control units to cause the vehicle to realize a predetermined behavior and providing the generated information to respective control units. Each control unit includes a sensing unit for sensing an operation request with respect to at least one control unit, and a calculation unit for calculating information related to a control target to manipulate an actuator set in correspondence with each unit using at least one of the information generated by the processing unit and the sensed operation request.

The invention of the present aspect includes, likewise the invention of the previous aspect, a driving system control unit, a brake system control unit, and a steering system control unit. The vehicle integrated control system includes a processing unit that operates parallel to the driving system control unit, brake system control unit, and steering system control unit, operating autonomously. The processing unit generates and provides to respective control units information to be used at respective controllers to cause the vehicle to realize a predetermined behavior. For example, the processing unit generates information to implement an automatic cruise function for automatic driving of the vehicle. The information to implement such an automatic cruise function is output to respective control units. Each control unit determines as to whether or not such input information for implementation of an automatic cruise function, in addition to the driver's request from the processing unit, is to be reflected in the motion control of the vehicle, and to what extent, if to be reflected. Each control unit also corrects the control target, and transmits the information among respective control units. Since each control unit operates autonomously, the power train, brake device and steering device are controlled eventually at respective control units based on the eventual driving target, braking target and steering target calculated from the driver's manipulation information sensed by the sensing unit, the information input from the processing unit, and information transmitted among respective control units. Thus, the driving system control unit corresponding to a "running" operation that is the basic operation of the vehicle, the brake system control unit corresponding to a "stop" operation, and the steering system control unit corresponding to a "turning" operation are provided operable in a manner independent of each other. The processing unit is applied with respect to these control units such that information to implement an automatic cruise function for automatic driving of the vehicle is generated and provided to respective control units. Therefore, a vehicle integrated control system can be provided, readily capable of accommodating an event of applying information to implement an automatic cruise function and adding a vehicle automatic cruise function.

According to still another aspect of the present invention, a vehicle integrated control system includes a plurality of control units controlling a running state of a vehicle based on a manipulation request, and a processing unit generating information to be used at respective control units based on the current dynamic state of the vehicle and providing the generated information to respective control units. Each control unit includes a sensing unit for sensing an operation request with respect to at least one control unit, and a calculation unit for calculating information related to a control target to operate an actuator set in correspondence with each unit using at least one of the information generated by the processing unit and the sensed operation request.

The invention of the present aspect includes, likewise the invention of the previous aspect, a driving system control unit, a brake system control unit, and a steering system control unit. The vehicle integrated control system includes a processing unit that operates parallel to the driving system control unit, brake system control unit, and steering system control unit, operating autonomously. The processing unit generates information to be used at respective controllers based on the current dynamic state of the vehicle and provides the generated information to respective control units. For example, the processing unit identifies the current dynamic state of the vehicle, and generates information to modify the target value at respective control units. The information to modify the target value is output to respective control units. Each control unit determines as to whether or not such input information to modify the target value based on the current dynamic state, in addition to the driver's request from the processing unit, is to be reflected in the motion control of the vehicle, and to what extent, if to be reflected. Each control unit also corrects the control target. For example, when slippage of the vehicle is identified (dynamic state), the driving system control unit functions to correct the driving torque to a smaller value, even if a large value is calculated as the target value, to avoid further slipping. Since each control unit operates autonomously, the power train, brake device and steering device are controlled eventually at respective control units based on the eventual driving target, braking target and steering target calculated from the driver's manipulation information sensed by the sensing unit, the information input from the processing unit, and information transmitted among respective control units. Thus, the driving system control unit corresponding to a "running" operation that is the basic operation of the vehicle, the brake system control unit corresponding to a "stop" operation, and the steering system control unit corresponding to a "turning" operation are provided operable in a manner independent of each other. The processing unit is applied with respect to these control units such that information to modify the target value of respective control units is generated and provided to respective control units. Therefore, a vehicle integrated control system can be provided, readily capable of accommodating an event of identifying the dynamic state of the vehicle and add a vehicle dynamic compensation function that stabilizes the behavior of the vehicle based on the dynamic state of the vehicle.

According to a still further aspect of the present invention, a vehicle integrated control system includes a plurality of control units controlling a running state of a vehicle based on a manipulation request, a first processing unit generating information to be used at respective control units based on environmental information around the vehicle or information related to the driver and providing the generated information to respective control units, a second processing unit generating information to be used at respective control units to cause the vehicle to realize a predetermined behavior and providing the generated information to respective control units, and a third processing unit generating information to be used at respective control units based on the current dynamic state of the vehicle and providing the generated information to respective control units. Each control unit includes a sensing unit for sensing an operation request with respect to at least one control unit, a first calculation unit for calculating first information related to a control target to operate an actuator set in correspondence with each unit using at least one of the information generated by the first processing unit and the sensed operation request, a second calculation unit for calculating second information related to a control target to operate an actuator set in correspondence with each unit using at least one of the information generated by the second processing unit and the calculated first information, and a third calculation unit for calculating third information related to a control target to operate an actuator set in correspondence with each unit using at least one of the information generated by the third processing unit and the calculated second information.

Similar to the invention set forth above, the invention of the present aspect includes a driving system control unit, a brake system control unit and a steering system control unit. The vehicle integrated control system includes first, second and third processing units operating parallel to the driving system control unit, brake system control unit and steering system control unit that operate autonomously. The first processing unit generates information to be used at respective control units based on environmental information around the vehicle or information related to the driver and provides the generated information to respective control units. For example, the first processing unit generates information representing the degree of risk with respect to the operation property of the vehicle based on the frictional resistance of the road on which the vehicle is running, the outdoor temperature and the like as the environmental information around the vehicle, and/or generates information representing the degree of risk with respect to the manipulation of the driver based on the fatigue level of the driver upon shooting a picture of the driver. The information representing the degree of risk is output to respective control units. The second processing unit generates and provides to respective control unit information to be used at respective control units to cause the vehicle to realize a predetermined behavior. For example, the second processing unit generates information for implementation of an automatic cruise function of the vehicle. Information to realize the automatic cruise function is output to respective control units. The third processing unit generates and provides to respective control units information to be used at respective controllers based on the current dynamic state of the vehicle. For example, the third processing unit identifies the current dynamic state of the vehicle to generate information required to modify the target value at respective control units. The information to modify the target value is output to respective control units. Each control unit determines as to whether or not such input information from the processing units, in addition to the driver's request from the processing unit, is to be reflected in the motion control of the vehicle, and to what extent, if to be reflected. At this stage, the control target is corrected, and information is transmitted among respective control units. Since each control unit operates autonomously, the power train, brake device and steering device are controlled eventually at respective control units based on the eventual driving target, braking target and steering target calculated from the driver's manipulation information sensed by the sensing unit, the information input from the processing unit, and information transmitted among respective control units. Thus, the driving system control unit corresponding to a "running" operation that is the basic operation of the vehicle, the brake system control unit corresponding to a "stop" operation, and the steering system control unit corresponding to a "turning" operation are provided operable in a manner independent of each other. The processing unit is applied with respect to these control units such that information related to risk and stability of environmental information around the vehicle and information related to the driver, information to implement an automatic cruise function for automatic driving of the vehicle, and information to modify the target value for respective control units are generated and provided to respective control units. Therefore, a vehicle integrated control system can be provided that can readily accommodate automatic cruising control of high level.

Further preferably, each unit operates autonomously and in parallel in the vehicle integrated control system.

In accordance with the present invention, the driving system control unit corresponding to a "running" operation that is the basic operation of the vehicle, the brake system control unit corresponding to a "stop" operation, and the steering system control unit corresponding to a "turning" operation are provided operable in a manner autonomous and in parallel. The processing unit is applied with respect to these control units in an autonomous and parallel manner. Therefore, decentralized control is allowed without having a master control unit, and fail safe faculty can be improved. Furthermore, by virtue of autonomous operation, development is allowed on the basis of each control unit or each processing unit. In the case where a new driving support function is to be added, the new function can be implemented by just adding a processing unit or modifying an existing processing unit.

Further preferably, the processing unit or the first processing unit includes a sensing unit for sensing environmental information around the vehicle, a sensing unit for sensing information related to the driver of the vehicle, and a processing unit generating information processed such that the sensed information is shared among respective controllers.

For example, the processing unit or the first processing unit in accordance with the present invention senses the environmental information around the vehicle or information related to the driver of the vehicle, and processes the information into labels (abstraction), for example, representing the degree or risk so as to be shared among respective controllers (the controller in the driving unit, the controller in the brake unit, and the controller in the steering unit). Accordingly, the information can be used in common among the basic control units, eliminating the need to change the data at the control unit.

Further preferably, the processing unit generates information representing the degree of correction with respect to the request from the driver at each controller.

In accordance with the present invention, the processing unit generates information representing the degree of risk, for example, representing the degree of correction with respect to a request from a driver such that the information can be shared among respective controllers. On the basis of such information, a target value can be generated at respective control units.

Further preferably, the processing unit or second processing unit includes a processing unit generating information processed so as to be shared among respective controllers based on information for implementation of automatic cruising or pseudo automatic cruising of the vehicle.

In accordance with the present invention, the processing unit or second processing unit senses information for implementation of automatic cruising or pseudo automatic cruising of a vehicle, and provides a flag to render the automatic cruise function valid such that information is shared among respective controllers (the controller in the driving unit, the controller in the brake unit, and the controller in the steering unit) and manipulates a target value for automatic cruising. When determination is made of conducting automatic cruising or pseudo automatic cruising based on such a flag, the information required for automatic cruising or pseudo automatic cruising can be used common to the basic control units, eliminating the need of data conversion at the control unit. The pseudo automatic cruise function includes functions in conformance with automatic cruising such as the cruise control function, lane keep assist function, and the like.

Further preferably, the processing unit generates information representing the degree of arbitration with respect to a control target at respective controllers.

When a flag rendering automatic cruise function valid is set in the present invention, arbitration is established between a target value (driving, braking and steering) based on the accelerator pedal manipulation, brake pedal manipulation, and steering manipulation of a driver, and a target value (driving, braking and steering) for automatic cruising or pseudo automatic cruising to determine a target value. A coordinating operation between driving based on the operation of a driver and automatic cruising can be realized.

Further preferably, the processing unit or third processing unit includes a processing unit generating information processed so as to be used common to respective controllers to realize a behavior of the vehicle consistent with the control target For example, when wheel slippage is detected as an example of the current dynamic state of the vehicle, the driving torque is modified to a small value, even if a large driving torque value is calculated as the target value, to avoid further slipping. Such vehicle dynamics compensation is conducted in both the brake system control unit and the steering system control unit. Since respective control units operate autonomously, the power train, brake device and steering device are controlled eventually at respective control units based on the eventual driving target, braking target and steering target calculated from the driver's manipulation information sensed by the sensing unit, the information input from the processing unit, and information transmitted among respective control units.

Further preferably, the processing unit generates information representing the degree of arbitration for a control target at respective controllers.

In accordance with the present invention, arbitration is established between a target value calculated based on the manipulation of the driver (drive, brake and the steering), and information modifying the target value input from the processing unit to produce an eventual target value.

Further preferably, the driving system control unit and brake system control unit have their driving force and braking force distributed with respect to the request driving force such that the desired behavior of the vehicle can be realized in co-operation.

The actuator to realize the requested driving force in the present invention includes a power train of the driving system (including engine, transmission), and the brake device of the brake system (wheel brake, auxiliary brake). The driving system control unit and brake system control unit controlling these actuators autonomously have their driving force and braking force distributed with respect to the requested driving force such that the desired behavior of the vehicle can be realized in co-operation. Since each control unit operates autonomously and in a distributed manner, communication is effected between the driving system control unit and brake system control unit to distribute the driving force and the braking force.

Further preferably, each control unit provides control such that reflection of information from the processing unit is rejected.

For example, in the control unit of the present invention, correction of a control target value, carried out based on information from an external processing unit other than itself, can be nullified. Accordingly, the target value can be corrected based on information input from a processing unit, only when reflection is intended.

Further preferably, each control unit outputs information to the processing unit, the second processing unit, or the third processing unit.

In accordance with the present invention, each control unit can output a request to assign driving support to, for example, the automatic cruise function unit, identified as the processing unit or second processing unit, to allow automatic cruising or pseudo automatic cruising.

Further preferably, each control unit is realized by each ECU (Electronic Control Unit). At each ECU, operation is executed from an upper control hierarchy corresponding to the request of the driver towards a lower control hierarchy corresponding to respective actuators.

In accordance with the present invention, each control unit has the operation executed autonomously and in parallel by each ECU. In other words, operation is conducted independently from the higher control hierarchy corresponding to the request of the driver (accelerator pedal manipulation level, brake pedal manipulation level, steering manipulation level) towards a lower control hierarchy corresponding to respective actuators at each of the driving system, brake system and steering system. As used herein, ECU refers to a computer in general.

Further preferably, the driving system control unit is realized by a first ECU. The brake system control unit is realized by a second ECU. The steering system control unit is realized by a third ECU. At each ECU, operation is executed from the higher control hierarchy corresponding to the request of a driver towards a lower control hierarchy corresponding to respective actuators. The processing unit is realized by a fourth ECU differing from the first to third ECUs. The first to third ECUs have their operation controlled in a parallel manner. The fourth ECU is connected to the higher control hierarchy side of the first to third ECUs via an interface.

In accordance with the present invention set forth above, input of information from a processing unit to the upper hierarchy side of respective control units allows the environmental information around the vehicle and information related to the driver to be applied to the hierarchical level of the request of the driver sensed by the sensing unit, which can be readily reflected in the control target value to be calculated.

BEST MODE FOR CARRYING OUT THE INVENTION

Figure 1:
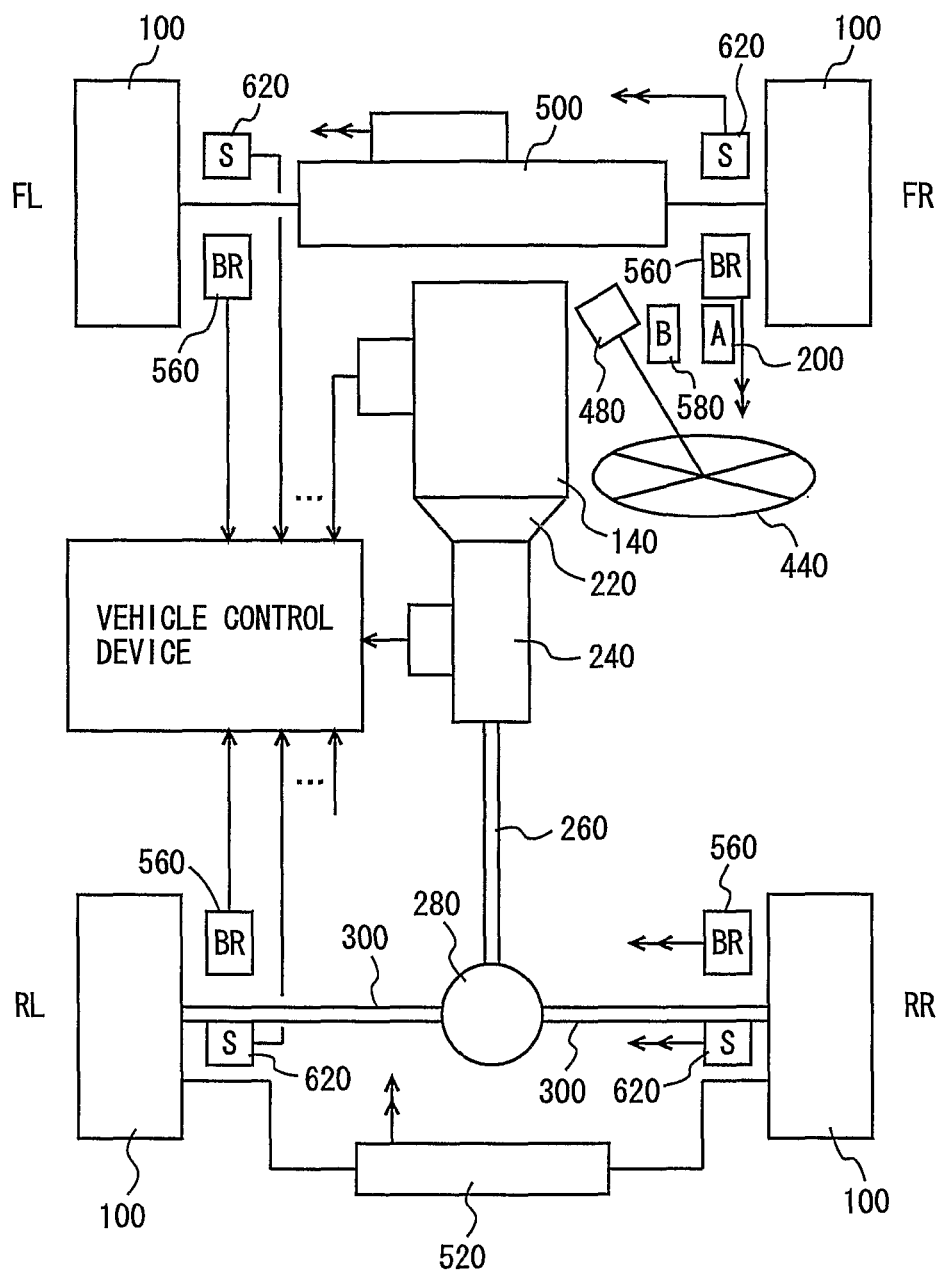
FIG. 1 is a block diagram of a vehicle in which the vehicle integrated control system of the present embodiment is incorporated.

An embodiment of the present invention will be described hereinafter with reference to the drawings. The same elements have the same reference characters allotted. Their label and function are also identical. Therefore, detailed description thereof will not be repeated.

Referring to the block diagram of FIG. 1, a vehicle integrated control system according to an embodiment of the present invention has an internal combustion engine incorporated in a vehicle as a driving power source. The driving power source is not restricted to an internal combustion engine, and may be an electric motor alone, or a combination of an engine and an electric motor. The power source of the electric motor may be a secondary battery or a cell.

The vehicle includes wheels 100 at the front and back of respective sides. In FIG. 1, "FL" denotes a front-left wheel, "FR" denotes a front-right wheel, "RL" denotes a left-rear wheel, and "RR" denotes a rear-right wheel.

The vehicle incorporates an engine 140 as a power source. The operating state of engine 140 is electrically controlled in accordance with the amount or level by which the accelerator pedal (which is one example of a member operated by the driver related to the vehicle drive) is manipulated by the driver. The operating state of engine 140 is controlled automatically, as necessary, irrespective of the manipulation of accelerator pedal 200 by the driver (hereinafter referred to as "driving operation" or "accelerating operation").

The electric control of engine 140 may be implemented by, for example, electrically controlling an opening angle (that is, a throttle opening) of a throttle valve disposed in an intake manifold of engine 140, or by electrically controlling the amount of fuel injected into the combustion chamber of engine 140.

The vehicle of the present embodiment is a rear-wheel-drive vehicle in which the right and left front wheels are driven wheels, and the right and left rear wheels are driving wheels. Engine 140 is connected to each of the rear wheels via a torque converter 220, a transmission 240, a propeller shaft 260 and a differential gear unit 280 as well as a drive shaft 300 that rotates with each rear wheel, all arranged in the order of description. Torque converter 220, transmission 240, propeller shaft 260 and differential gear 280 are power transmitting elements that are common to the right and left rear wheels.

Transmission 240 includes an automatic transmission that is not shown. This automatic transmission electrically controls the gear ratio at which the revolution speed of engine 140 is changed to the speed of rotation of an output shaft of transmission 240.

The vehicle further includes a steering wheel 440 adapted to be turned by the driver. A steering reaction force applying device 480 electrically applies a steering reaction force corresponding to a turning manipulation by the driver (hereinafter, referred to as "steering") to steering wheel 440. The level of the steering reaction force is electrically controllable.

The direction of the right and left front wheels, i.e. the front-wheel steering angle is electrically altered by a front steering device 500. Front steering device 50 controls the front-wheel steering angle based on the angle, or steering wheel angle, by which steering wheel 440 is turned by the driver. The front-rear steering angle is controlled automatically, as necessary, irrespective of the turning operation. In other words, steering wheel 440 is mechanically insulated from the right and left front wheels.

The direction of the left and right wheels, i.e., the rear-wheel steering angle is electrically altered by a rear steering device 520, likewise the front-wheel steering angle.

Each wheel 100 is provided with a brake 560 that is actuated so as to restrict its rotation. Each brake 560 is electrically controlled in accordance with the operated amount of a brake pedal 580 (which is one example of a member operated by the driver related to vehicle braking), and also controlled individually for each wheel 100 automatically.

In the present vehicle, each wheel 100 is suspended to the vehicle body (not shown) via each suspension 620. The suspending characteristics of respective suspension 620 is electrically controllable individually.

The constituent elements of the vehicle set forth above include an actuator adapted to be operated so as to electrically actuate respective elements as follows:

(1) An actuator to electrically control engine 140;

(2) An actuator to electrically control transmission 240;

(3) An actuator to electrically control steering reaction force applying device 480;

(4) An actuator to electrically control front steering device 500;

(5) An actuator to electrically control rear steering device 520;

(6) A plurality of actuators provided in association with respective brakes 560 to electrically control the braking torque applied to each wheel by a corresponding brake 560 individually;

(7) A plurality of actuators provided in association with respective suspensions 620 to electrically control the suspending characteristics of a corresponding suspension 620 individually.

As shown in FIG. 1, the vehicle integrated control system is incorporated in a vehicle having the aforesaid plurality of actuators connected. The motion control device is actuated by the electric power supplied from a battery not shown (which is an example of the vehicle power supply).

Additionally, an accelerator pedal reaction force applying device may be provided for accelerator pedal 200. In this case, an actuator to electrically control such an accelerator pedal reaction force applying device is to be provided.

Figure 2:
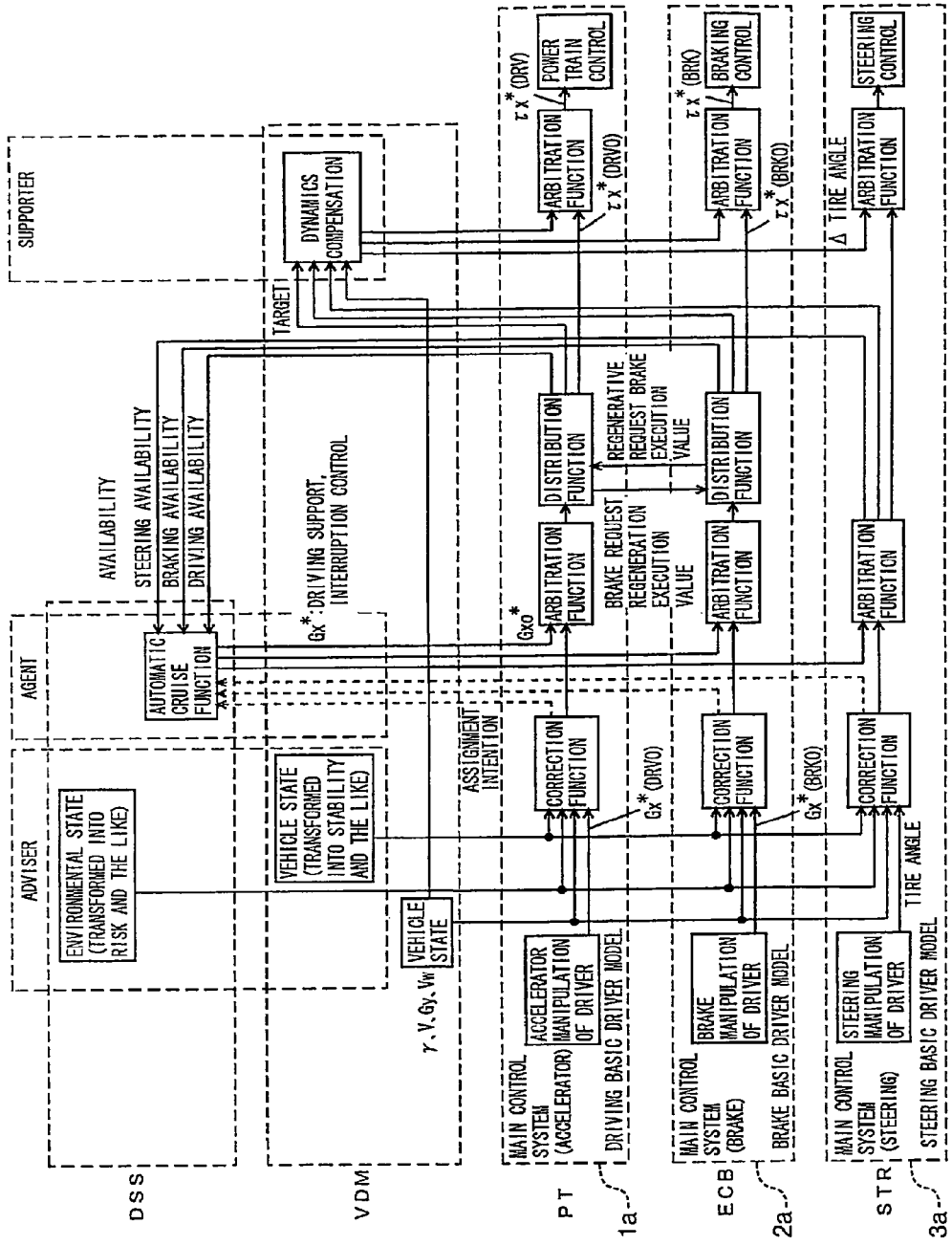
FIG. 2 is a schematic diagram of a configuration of the vehicle integrated control system according to the present embodiment.

FIG. 2 is a schematic diagram of a configuration of the vehicle integrated control system. The vehicle integrated control system is formed of three basic control units, i.e. a main control system 1a as the driving system control unit, a main control system 2a as the brake system control unit, and a main control system 3a as the steering system control unit.

At main control system 1a identified as the driving system control unit, a control target of the driving system corresponding to accelerator pedal manipulation is generated using the driving basic driver model, based on the accelerator pedal manipulation that is the sensed request of the driver, whereby the actuator is controlled. At main control system 1a, the input signal from the sensor to sense the accelerator pedal operated level of the driver (stroke) is analyzed using the drive basic model to calculate a target longitudinal acceleration Gx*(DRV0). The target longitudinal acceleration Gx*(DRV0) is corrected by a correction functional block based on the information from an adviser unit. Further, target longitudinal acceleration Gx*(DRV0) is arbitrated by the arbitration functional block based on the information from an agent unit. Further, the driving torque and braking torque is distributed with main control system 2a, and the target driving torque τx*(DRV0) of the driving side is calculated. Further, the target driving torque τx*(DRV0) is arbitrated by the arbitration functional block based on information from a supporter unit, and a target driving torque τx*(DRV) is calculated. The power train (140, 220, 240) is controlled so as to develop this target drive torque τx*(DRV).

At main control system 2a identified as the brake system control unit, a control target of the brake system corresponding to the brake pedal manipulation is generated using the brake basic driver model based on the brake pedal manipulation that is the sensed request of the driver, whereby the actuator is controlled.

At main control system 2a, the input signal from a sensor to sense the brake pedal manipulated level (depression) of the driver is analyzed using a brake basic model to calculate a target longitudinal acceleration Gx*(BRK0). At main control system 2a, the target longitudinal acceleration Gx*(BRK0) is corrected by a correction functional block based on the information from the adviser unit. Further at main control system 2a, the target longitudinal acceleration Gx*(BRK0) is arbitrated by the arbitration functional block based on the information from the agent unit. Further at main control system 2a, the driving torque and the braking torque are distributed with main control system 1a, and the target braking torque τx*(BRK0) of the braking side is calculated. Further, the target braking torque τx*(BRK0) is arbitrated by the arbitration functional block based on the information from the support unit, and target braking torque τx*(BRK) is calculated. The actuator of brake 560 is controlled so as to develop this target braking torque τx*(BRK).

At main control system 3a identified as the steering system control unit, a control target of the steering system corresponding to the steering manipulation is generated using the steering brake basic driver model based on the steering manipulation that is the sensed request of the driver, whereby the actuator is controlled.

At main control system 3a, an input signal from the sensor to sense the steering angle of the driver is analyzed using a steering basic model to calculate a target tire angle. The target tire angle is corrected by the correction functional block based on the information from the adviser unit. Further, the target tire angle is arbitrated by the arbitration functional block based on the information from the agent unit. Further, the target tire angle is arbitrated by the arbitration functional block based on the information from the supporter unit to calculate the target tire angle. The actuators of front steering device 500 and rear steering device 520 are controlled so as to develop the target tire angle.

Furthermore, the present vehicle integrated control system includes a plurality of processing units parallel to main control system 1a (driving system control unit), main control system 2a (brake system unit) and main control system 3a (steering system control unit), operating autonomously. The first processing unit is an adviser unit with an adviser function. The second processing unit is an agent unit with an agent function. The third processing unit is a support unit with a supporter function.

The adviser unit generates and provides to respective main control systems information to be used at respective main control systems based on the environmental information around the vehicle or information related to the driver. The agent unit generates and provides to respective main control systems information to be used at respective main control systems to cause the vehicle to realize a predetermined behavior. The supporter unit generates and provides to respective main control systems information to be used at respective main control systems based on the current dynamic state of the vehicle. At respective main control systems, determination is made as to whether or not such information input from the adviser unit, the agent unit and the supporter unit (information other than the request of the driver) is to be reflected in the motion control of the vehicle, and to what extent, if to be reflected. Furthermore, the control target is corrected, and/or information is transmitted among respective control units. Since each main control system operates autonomously, the actuator of the power train, the actuator of brake device and the actuator of steering device are controlled eventually at respective control units based on the eventual driving target, braking target and steering target calculated by the sensed manipulation information of the driver, information input from the adviser unit, agent unit and supporter unit, and information transmitted among respective main control systems.

Specifically, the adviser unit generates information representing the degree of risk with respect to the vehicle operation property based on the frictional resistance (μ value) of the road on which the vehicle is running, the outdoor temperature and the like as the environmental information around the vehicle, and/or generates information representing the degree of risk with respect to the manipulation of the driver based on the fatigue level of the driver upon shooting a picture of the driver. Information representing the degree of risk is output to each main control system. This information representing the degree of risk is processed at the adviser unit so the information can be used at any of the main control systems. At each main control system, the process is carried out as to whether or not to reflect the information related to the input risk for the vehicle motion control, in addition to the request of the driver from the adviser unit, and to what extent the information is to be reflected, and the like.

Specifically, the agent unit generates information to implement an automatic cruise function for the automatic drive of vehicle. The information to implement the automatic cruise function is output to each main control system. At each main control system, the process is carried out as to whether or not to reflect the input information to implement the automatic cruise function, in addition to the request of the driver from the processing unit, and to what extent the information is to be reflected, and the like.

Further preferably, the supporter unit identifies the current dynamic state of the vehicle, and generates information to modify the target value at each main control system. The information to modify the target value is output to each main control system. At each main control system, the process is carried out as to whether or not to reflect the input information to modify the target value based on the dynamic state for the vehicle motion control, in addition to the request of the driver from the processing unit, and to what extent the information is to be reflected, and the like.

As shown in FIG. 2, the basic control units of main control system 1$a$, main control system 2$a$ and main control system 3$a$, and the support unit of the adviser unit, agent unit, and supporter unit are all configured so as to operate autonomously. Main control system 1$a$ is designated as the PT (Power Train) system. Main control system 2$a$ is designated as the ECB (Electronic Controlled Brake) system. Main control system 3$a$ is designated as the STR (Steering) system. A portion of the adviser unit and the portion of the agent unit are designated as the DSS (Driving Support System). A portion of the adviser unit, a portion of the agent unit, and a portion of the supporter unit are designated as the VDM (Vehicle Dynamics Management) system. Interruption control for intervention of control executed at main control system 1$a$, main control system 2$a$ and main control system 3$a$ from the agent unit (automatic cruise function) is conducted in the control shown in FIG. 2.

Main control system 1$a$ (driving system control unit) will be described in further detail with reference to FIG. 3. Although the designation of the variable labels may differ in FIG. 3 and et seq., there is no essential difference thereby in the present invention. For example, the interface is designated as Gx*(acceleration) in FIG. 2 whereas the interface is designated as Fx (driving force) in FIG. 3 and et seq. This corresponds to F (force)=m (mass)=α (acceleration), where the vehicle mass (m) is not the subject of control, and is not envisaged of being variable. Therefore, there is no essential difference between Gx*(acceleration) of FIG. 2 and Fx (driving force) of FIG. 3 and et seq.

Main control system (1) that is the unit to control the driving system receives information such as the vehicle velocity, gear ratio of the transmission and the like identified as shared information (9). Using such information and the driving basic driver model, Fxp0 representing the target longitudinal direction acceleration is calculated as the output of the driving basic driver model. The calculated Fxp0 is corrected to Fxp1 by a correction functional unit (2) using environmental state (6) that is the risk degree information (index) as an abstraction of risk and the like, input from the adviser unit. Information representing the intention of assignment with respect to realizing an automatic cruise function is output from correction functional unit (2) to agent unit (7). Using Fxp1 corrected by correction functional unit (2) and information for implementation of automatic cruise functional unit (7), input from the agent unit, the information (Fxp1, Fxa) is arbitrated by arbitration functional unit (3) to Fxp2.

The dividing ratio of the driving torque and braking torque is calculated between main control system 1$a$ that is the unit controlling the driving system and main control system 2$a$ that is the unit driving the brake system. At main control system 1$a$ corresponding to the driving unit side, Fxp3 of the driving system is calculated. FxB is output from distribution functional unit (4) to main control system 2$a$, and the driving availability and target value are output to agent unit (7) and dynamic (8) that is the supporter unit, respectively.

At arbitration functional unit (5), the information is arbitrated to Fxp4 using Fxp3 output from distribution functional unit (4) and Fxp_vdm from dynamics compensation functional unit (8). Based on the arbitrated Fxp4, the power train is controlled.

Figure 3:
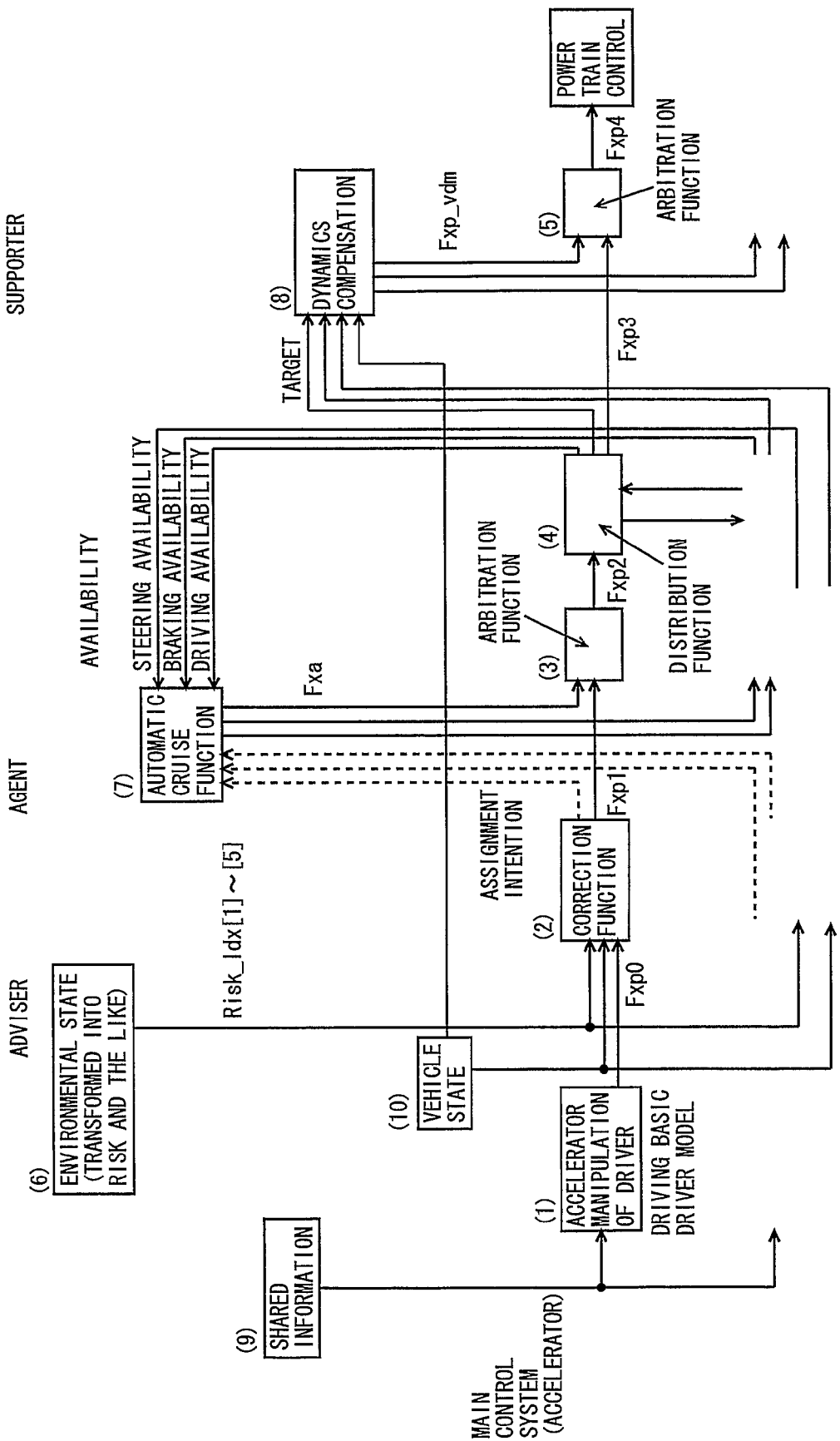
FIG. 3 is a schematic diagram of a configuration of a main control system (1).

The elements shown in FIG. 3 are also present in main control system 2$a$ and main control system 3$a$. Since main control system 2$a$ and main control system 3$a$ will be described in further detail with reference to FIGS. 5-6, description on main control system 2$a$ and main control system 3$a$ based on drawings corresponding to main control system (1) of FIG. 3 will not be repeated.

Figure 4:
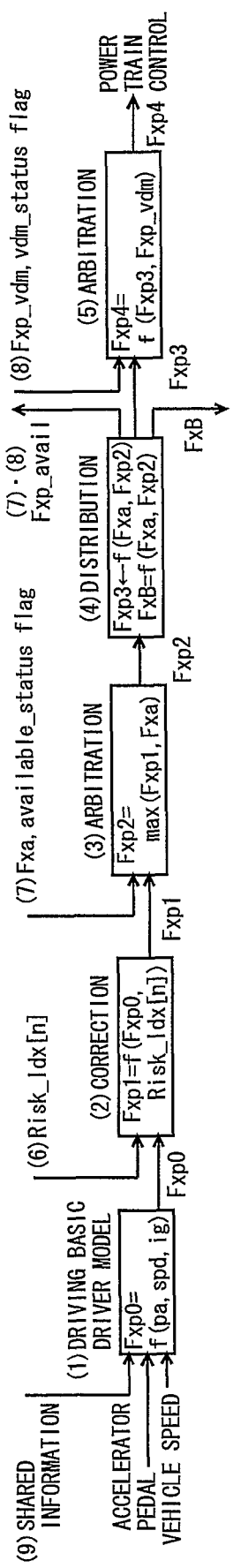
FIG. 4 is a diagram representing the input and output of signals in a main control system (1).
Figure 5:
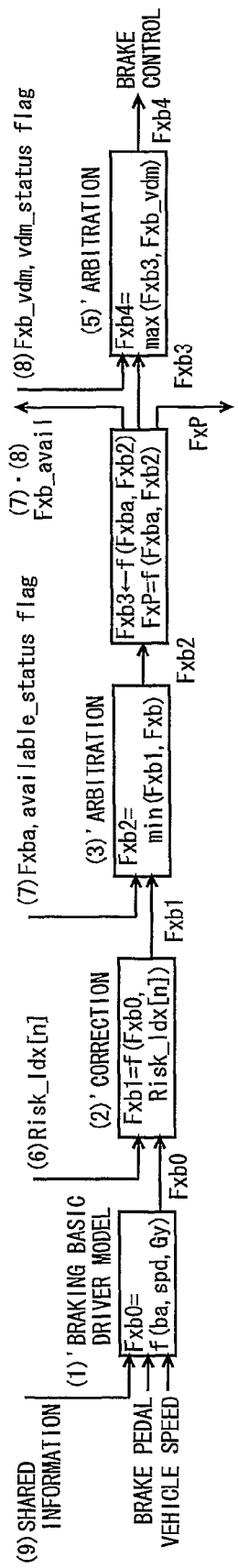
FIG. 5 is a diagram representing the input and output of signals in a main control system (2).
Figure 6:
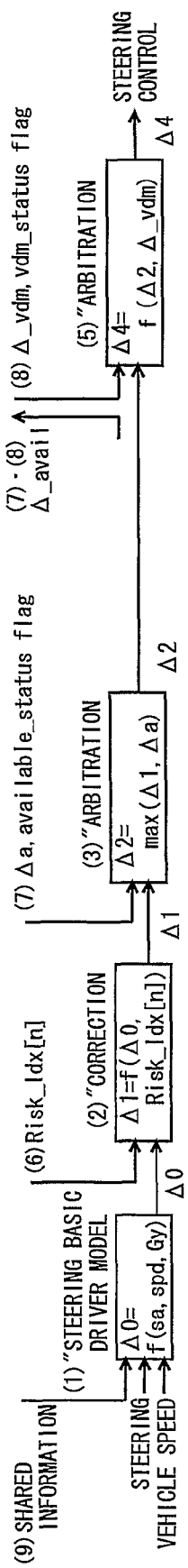
FIG. 6 is a diagram representing the input and output of signals in a main control system (3).

FIGS. 4-6 represent the control configuration of main control system 1$a$, main control system 2$a$ and main control system 3$a$.

FIG. 4 shows a control configuration of main control system 1$a$. Main control system 1$a$ that covers control of the driving system is adapted by the procedures set forth below.

At driving basic driver model (1), the basic drive driver model output (Fxp0) is calculated based on HMI (Human Machine Interface) input information such as the accelerator pedal opening angle (pa), vehicle speed (spd) and gear ratio (ig) of the transmission that are shared information (9), and the like. The equation at this stage is represented by Fxp0=f (pa, spd, ig), using function f.

At correction functional unit (2), Fxp0 is corrected to output Fxp1 based on Risk_Idx [n] that is the environmental information (6) from the advisor unit (for example, information transformed into the concept of risk or the like). The equation at this stage is represented by Fxp1=f (Fxp0, Risk_Idx [n]), using function f Specifically, it is calculated by, for example, Fxp11=Fxp0× Risk_Idx [n]. The degree of risk is input from the advisor unit such as Risk_Idx [1]=0.8, Risk_Idx [2]=0.6, and Risk_Idx [3]=0.5.

Additionally, Fxp12 is calculated, which is a corrected version of Fxp0, based on information that is transformed into the concept of stability and the like from the vehicle state (10). The equation at this stage is represented by, for example, Fxp12=Fxp0×Stable_Idx [n]. The stability is input such as Stable_Idx [1]=0.8, Stable_Idx [2]=0.6, and Stable_Idx [3]=0.5.

A smaller value of these Fxp11 and Fxp12 may be selected to be output as Fxp1.

In this correction functional unit (2), assignment intention information can be output to automatic cruise functional unit (7) that is an agent function when the driver depresses the cruise control switch. In the case where the accelerator pedal is a reaction force controllable type here, the automatic cruise intention of the driver is identified based on the driver's manipulation with respect to the accelerator pedal to output assignment intention information to automatic cruise functional unit (7).

At arbitration functional unit (3), arbitration between Fxp1 output from correction functional unit (2) and Fxa output from automatic cruise functional unit (7) of the agent unit is executed to output Fxp2 to distribution unit (4). When accompanied with additional information (flag, available_status flag) indicative of output Fxa from automatic cruise functional unit (7) being valid, the arbitration function selects Fxa that is the output from automatic cruise functional unit (7) with highest priority to calculate Fxp2. In other cases, Fxp1 that is the output from correction functional unit (2) may be selected to calculate Fxp2, or Fxp1 output from correction function unit (2) may have Fxa reflected at a predetermined degree of reflection to calculate Fxp2. The equation at this stage is represented by Fxp2=max (Fxp1, Fxa), for example, using a function "max" that selects the larger value.

At distribution functional unit (4), distribution operation is mainly effected between main control system 1a that is the driving system control unit and main control system 2a that is the brake system control unit. Distribution functional unit (4) functions to output Fxp3 to arbitration functional unit (5) for the distribution towards the driving system that is the calculated result, and outputs FxB to main control system 2a for the distribution towards the brake system that is the calculated result. Further, drive availability Fxp_avail identified as the information of the driving power source that can be output from the power train which is the subject of control of main control system 1a is provided to automatic cruise functional unit (7) identified as the agent unit and dynamics compensation functional unit (8) identified as the supporter unit. The equation at this stage is represented by Fxp3←f (Fxa, Fxp2), FxB=f (Fxa, Fxp2), using function f.

At arbitration functional unit (5), arbitration is executed between Fxp3 output from distribution functional unit (4) and Fxp_vdm output from dynamics compensation functional unit (8) to output Fxp4 to the power train controller. When accompanied with additional information (flag, vdm_status flag) indicative of Fxp_vdm output from dynamics compensation functional unit (8) being valid, the arbitration function selects Fxp_vdm that is the output from dynamics compensation functional unit (8) with highest priority to calculate Fxp4. In other cases, Fxp3 that is the output from distribution functional unit (4) can be selected to calculate Fxp4, or Fxp3 output from distribution functional unit (4) may have Fxp_vdm reflected by a predetermined degree of reflection to calculate Fxp4. The equation at this stage is represented by, for example, Fxp4=f (Fxp3, Fxp_vdm).

FIG. 5 represents the control configuration of main control system 2a. Main control system 2a covering the control of the brake system is adapted by the procedure set forth below.

At the brake basic driver model (1)', the basic braking driver model output (Fxp0) is calculated based on the HMI input information such as the brake pedal depression (ba), as well as vehicle speed (spd), that is the shared information (9), the lateral G acting on the vehicle (Gy), and the like. The equation at this stage is represented by Fxb0=f (pa, spd, Gy), using function f.

At correction function unit (2)', Fxb0 is corrected to output Fxb1 based on Risk_Idx [n] that is the environmental information (6) from the advisor unit (for example, information transformed into the concept of risk and the like). The equation at this stage is represented by Fxb1=f (Fxb0, Risk_ldx [n]), using function f.

More specifically, it is calculated by, for example, Fxb11=Fxb0×Risk_Idx [n]. The degree of risk is input from the advisor unit such as Risk_Idx [1]=0.8, Risk_Idx [2]=0.6, and Risk_Idx [3]=0.5.

Further, Fxb12 that is a corrected version of Fxb0 is calculated, based on information transformed into the concept of stability and the like from the vehicle state (10). It is calculated by, for example, Fxb12=Fxb0×Stable_Idx [n]. For example, Stable_Idx [1]=0.8, Stable_Idx [2]=0.6, and Stable_Idx [3]=0.5 are input.

The larger of these Fxb11 and Fxb12 may be selected to be output as Fxb1. Specifically, the output may be corrected in accordance with the distance from the preceding running vehicle sensed by a millimeter wave radar, the distance to the next corner sensed by the navigation device, or the like.

At arbitration functional unit (3)', arbitration is executed between Fxb1 output from correction functional unit (2)' and Fxba output from automatic cruise functional unit (7) that is the agent unit to output Fxb2 to distribution unit (4)'. When accompanied with additional information (flag, available_status flag) indicative of Fxba output from automatic cruise functional unit (7) being valid, the arbitration function selects Fxba that is the output from automatic cruise functional unit (7) with highest priority to calculate Fxb2. In other cases, Fxb1 that is the output from correction functional unit (2)' may be selected to calculate Fxb2, or Fxb1 that is the output from correction functional unit (2)' may have Fxba reflected by a predetermined degree of reflection to calculate Fxb2. The equation at this stage is represented by, for example, Fxb2=max (Fxb1, Fxba), using a function "max" that selects the larger value.

At distribution functional unit (4)', distribution operation is conducted between main control system 1a that is the driving system control unit and main control system 2a that is the brake system control unit. Functional distribution unit (4)' corresponds to distribution functional unit (4) of main control system 1a. Distribution functional unit (4)' outputs Fxb3 to arbitration functional unit (5)' for distribution towards the brake system that is the calculated result, and outputs FxP to main control system 1a for distribution towards the driving system that is the calculated result. Further, brake availability Fxb_avail identified as information that can be output from the brake that is the subject of control of main control system 2a is provided to automatic cruise functional unit (7) identified as the agent unit and dynamics compensation functional unit (8) identified as the supporter unit. The equation at this stage is represented by Fxb3←f (Fxba, Fxb2), FxP=f (Fxba, Fxb2), using function f.

Arbitration functional unit (5)' executes arbitration between Fxb3 output from distribution functional unit (4)' and Fxb_vdm output from dynamics compensation functional unit (8) that is the support unit to output Fxb4 to the brake controller. When accompanied with additional information (flag, vdm_status flag) indicative of Fxb_vdm output from dynamics compensation functional unit (8) being valid, the arbitration function selects Fxb_vdm that is the output from dynamics compensation functional unit (8) with highest priority to calculate Fxb4. In other cases, Fxb3 that is the output from distribution functional unit (4)' may be selected to calculate Fxb4, or Fxb3 output from distribution functional unit (4)' may have Fxb_vdm reflected by a predetermined degree of reflection to calculate Fxb4. The equation at this stage is represented by, for example, Fxb4=max (Fxb3, Fxb_vdm), using a function "max" that selects the larger value.

FIG. 6 shows a control configuration of main control system 3a. Main control system 3a covering control of the steering system is adapted to control by the procedure set forth below.

At steering basic driver model (1)", basic steering driver model output ($\Delta 0$) is calculated based on HMI input information such as the steering angle (sa), vehicle speed (spd) that is shared information (9), lateral G acting on the vehicle (Gy), and the like. The equation at this stage is represented by $\Delta 0$=f (sa, spd, Gy), using function f.

At correction functional unit (2)", $\Delta 0$ is corrected to output $\Delta 1$ based on Risk_Idx [n] that is environmental information (6) from the adviser unit (for example, information transformed into the concept of risk, and the like). The equation at this stage is represented by $\Delta 1$=f ($\Delta 0$, Risk_Idx [n]), using function f.

Specifically, it is calculated by $\Delta 11$=$\Delta 0$×Risk_Idx [n]. The degree of risk is input from the adviser unit such as Risk_Idx [n]=0.8, Risk_Idx [2]=0.6, and Risk_Idx [3]=0.5.

Further, $\Delta 12$ that is a corrected version of $\Delta 0$ is calculated based on information transformed into the concept of stability and the like from the vehicle state (10). The equation at this stage is represented by $\Delta 12$=$\Delta 0$×Stable_Idx [n]. For example, Stable_Idx [1]=0.8, Stable_Idx [2]=0.6, and Stable_Idx [3]=0.5 are input.

The smaller of these $\Delta 11$ and $\Delta 12$ may be selected to be output as $\Delta 1$.

At correction functional unit (2)", assignment intention information to automatic cruise functional unit (7) that is the agent function can be output when the driver has depressed the lane keep assist switch. Furthermore, the output may be corrected in accordance with an external disturbance such as the side wind at correction functional unit (2)".

At arbitration functional unit (3)", arbitration is executed between $\Delta 1$ output from correction functional unit (2)" and $\Delta$a output from automatic cruise functional unit (7) that is the agent unit to output $\Delta 2$ to arbitration unit (5)". When accompanied with additional information (flag, available_status flag) indicative of $\Delta$a that is the output from automatic cruise functional unit (7) being valid, the arbitration function selects $\Delta$a that is the output from automatic cruise functional unit (7) with the highest priority to calculate $\Delta 2$. In other cases, $\Delta 1$ that is the output from correction functional unit (2)" may be selected to calculate $\Delta 2$, or $\Delta 1$ that is the output from correction functional unit (2)" may have $\Delta$a reflected by a predetermined degree of reflection to calculate $\Delta 2$. The equation at this stage is represented by, for example, $\Delta 2$=f ($\Delta 1$, $\Delta$a).

At arbitration functional unit (5)", arbitration is executed between $\Delta 2$ output from arbitration functional unit (3)" and $\Delta$_vdm output from dynamics compensation function unit (8) that is the supporter unit to provide $\Delta 4$ to the steering controller. When accompanied with additional information (flag, vdm_status flag) indicative of $\Delta$_vdm output from dynamics compensation functional unit (8) being valid, the arbitration function selects $\Delta$_vdm that is the output from dynamics compensation functional unit (8) with highest priority to calculate $\Delta 4$. In other cases, $\Delta 2$ may be selected that is the output from arbitration functional unit (3)" to calculate $\Delta 4$, or $\Delta 2$ that is the output from arbitration functional unit (3)"may have $\Delta$_vdm reflected by a predetermined degree of reflection to calculate $\Delta 4$. The equation at this stage is represented by, for example, $\Delta 4$=max ($\Delta 2$, $\Delta$_vdm), using a function "max" that selects the larger value.

The operation of a vehicle incorporating the integrated control system set forth above will be described hereinafter.

During driving, the driver manipulates accelerator pedal 200, brake pedal 580 and steering wheel 440 to control the driving system control unit corresponding to the "running" operation that is the basic operation of a vehicle, the brake system control unit corresponding to the "stop" operation, and the steering system control unit corresponding to a "turning" operation, based on information obtained by the driver through his/her own sensory organs (mainly through sight). Basically, the driver controls the vehicle through HIM input therefrom. There may also be the case where the driver manipulates the shift lever of the automatic transmission to modify the gear ratio of transmission 240 in an auxiliary manner.

During the drive of a vehicle, various environmental information around the vehicle is sensed by various devices incorporated in the vehicle, in addition to the information obtained by the driver through his/her own sensory organs. The information includes, by way of example, the distance from the vehicle running ahead, sensed by a millimeter wave radar, the current vehicle position and the road state ahead (corner, traffic jam, and the like) sensed by the navigation device, the road inclination state sensed by a G sensor (level road, up-climbing road, down-climbing road), the outdoor temperature of vehicle sensed by an outdoor temperature sensor, local weather information of the current running site received from a navigation device equipped with a receiver, the road resistance coefficient (low μ road state and the like by road surface freezing state), the running state of the vehicle ahead sensed by a blind corner sensor, a lane-keep state sensed based upon an image-processed picture taken by an outdoor camera, the driving state of the driver sensed based upon an image-processed picture taken by an indoor camera (driver posture, wakeful state, nod-off state), the dosing state of a driver sensed by sensing and analyzing the grip of the driver's hand by a pressure sensor provided at the steering wheel, and the like. These information are divided into environmental information around the vehicle, and information about the driver himself/herself. It is to be noted that both information are not sensed through the sensory organs of the driver.

Furthermore, the vehicle dynamic state is sensed by a sensor provided at the vehicle. The information includes, by way of example, wheel speed Vw, vehicle speed in the longitudinal direction Vx, longitudinal acceleration Gx, lateral acceleration Gy, yaw rate γ, and the like.

The present vehicle incorporates a cruise control system and a lane-keep assist system as the driving support system to support the driver's drive. These systems are under control of the agent unit. It is expected that a further development of the agent unit will lead to implementation of a complete automatic cruising operation, exceeding the pseudo automatic cruising. The integrated control system of the present embodiment is applicable to such cases. Particularly, implementation of such an automatic cruising system is allowed by just modifying the automatic cruise function of the agent unit to an automatic cruise function of a higher level without modifying the driving system control unit corresponding to main control system (1), the brake system control unit corresponding to main control system (2), the steering system control unit corresponding to main control system (3), the adviser unit, and the supporter unit.

Consider a case where there is a corner ahead in the currently-running road during driving. This corner cannot be identified by the eye sight of the driver, and the driver is not aware of such a corner. The adviser unit of the vehicle senses the presence of such a corner based on information from a navigation device.

When the driver steps on accelerator pedal 200 for acceleration in the case set forth above, the driver will depress brake pedal 580 subsequently to reduce the speed of the vehicle at the corner. At main control system (1), the basic drive driver model output Fxp0 is calculated by Fxp0=f (pa, spd, ig), based on the accelerator pedal opening angle (pa), vehicle speed (spd), gear ratio of the transmission (ig), and the like. Conventionally, a large request driving torque value will be calculated based on this FxP0 to cause opening of the throttle valve of engine 140, and/or reducing the gear ratio of transmission 240 to cause vehicle acceleration. In the present invention, the adviser unit calculates the degree of risk Risk_Idx [n] based on the presence of the corner ahead and outputs this information to correction functional unit (2). Correction functional unit (2) performs correction such that acceleration is not exhibited as the driver will expect from his/her depression on accelerator pedal 200.

When the supporter unit senses that the road surface is freezing and there is a possibility of slipping sideways by the vehicle longitudinal acceleration at this stage, Stable_Idx [n] that is the degree of risk related to stability is calculated and output to correction functional unit (2). Thus, correction functional unit (2) performs correction such that acceleration is not exhibited as the driver will expect from his/her depression on accelerator pedal 200.

When slippage of the vehicle is sensed, the supporter unit outputs to arbitration functional unit (5) a signal that will reduce the driving torque. In this case, Fxp_vdm from the supporter unit is employed with priority such that the power train is controlled to suppress further slippage of the vehicle. Therefore, even if the driver steps on accelerator pedal 200 greatly, arbitration is established such that the acceleration is not exhibited as the driver will expect from his/her depression on accelerator pedal 200.

Thus, the vehicle integrated control system of the present embodiment operates as follows: at main control system 1a identified as the driving system control unit, accelerator pedal manipulation that is a request of a driver is sensed, and a control target of the driving system corresponding to the accelerator pedal manipulation is generated using a driving basic driver model, whereby the power train that is a drive actuator is controlled. At main control system 2a identified as the brake system control unit, brake pedal manipulation that is a request of the driver is sensed, and a control target of the brake system corresponding to the brake pedal manipulation is generated using a brake basic driver model, whereby the brake device that is the braking actuator is controlled. At main control system 3a identified as the steering system control unit, steering manipulation that is a request of the driver is sensed, and a control target of the steering system corresponding to the steering manipulation is generated using a steering basic driver model, whereby the steering device that is an actuator is controlled. These control units operate autonomously.

In addition to the driving system control unit, brake system control unit, and steering system control unit operating autonomously, there are further provided an adviser unit, an agent unit, and a supporter unit. The adviser unit generates and provides to respective control units information to be used at respective control units based on environmental information around the vehicle or information related to the driver. The adviser unit processes information representing the degree of risk with respect to operation characteristics of the vehicle based on the frictional resistance of the running road, outer temperature and the like as environmental information around the vehicle, and/or information representing the degree of risk with respect to the manipulation of a driver based on the fatigue level of the driver upon shooting a picture of the driver so as to be shared among respective control units. The agent unit generates and provides to respective control units information to be used at respective control units to cause the vehicle to implement a predetermined behavior. The agent unit generates information to implement an automatic cruise functions for automatic cruising of vehicle. Information to implement the automatic cruise function is output to respective control units. The supporter unit generates and provides to respective control units information to be used at respective control unit based on the current dynamic state of the vehicle. The supporter unit identifies the current dynamic state of the vehicle to generate information required to modify the target value at respective control units.

At respective control units, arbitration processing is conducted as to whether information output from the adviser unit, agent unit and supporter unit is to be reflected in the motion control of the vehicle, and if to be reflected, the degree of reflection thereof. These control unit, adviser unit, agent unit and supporter unit operate autonomously. Eventually at respective control units, the power train, brake device, and steering device are controlled based on the eventual drive target, braking target, and steering target calculated by information input from the adviser unit, agent unit and supporter unit, as well as information communicated among respective control units.

Thus, the driving system control unit corresponding to a "running" operation that is the basic operation of the vehicle, the brake system control unit corresponding to a "stop" operation, and the steering system control unit corresponding to a "turning" operation are provided operable in a manner independent of each other. With respect to these control units, the adviser unit, agent unit and supporter unit are provided, that can generate and output to respective control units information related to the risk and stability with respect to environmental information around the vehicle and information related to the driver, information to implement automatic cruise function for automatic cruising of the vehicle, and information required to modify the target value of respective control units to these control units. Therefore, a vehicle integrated control system that can readily accommodate automatic cruising control of high level can be provided.

In the case where the flag from the adviser unit, agent unit and supporter unit is reset with the manipulation of the driver given highest priority, control using a signal from this driving support unit will not be conducted.

Modification

Four modifications of the embodiment of the present invention will be described hereinafter with reference to FIGS. 7-10. All modifications have a control structure identical to that of FIG. 2 as to the feature of main control system 1a identified as the driving system control unit, main control system 2a identified as the brake system control unit, and main control system 3a identified as the steering system control unit.

Figure 7:
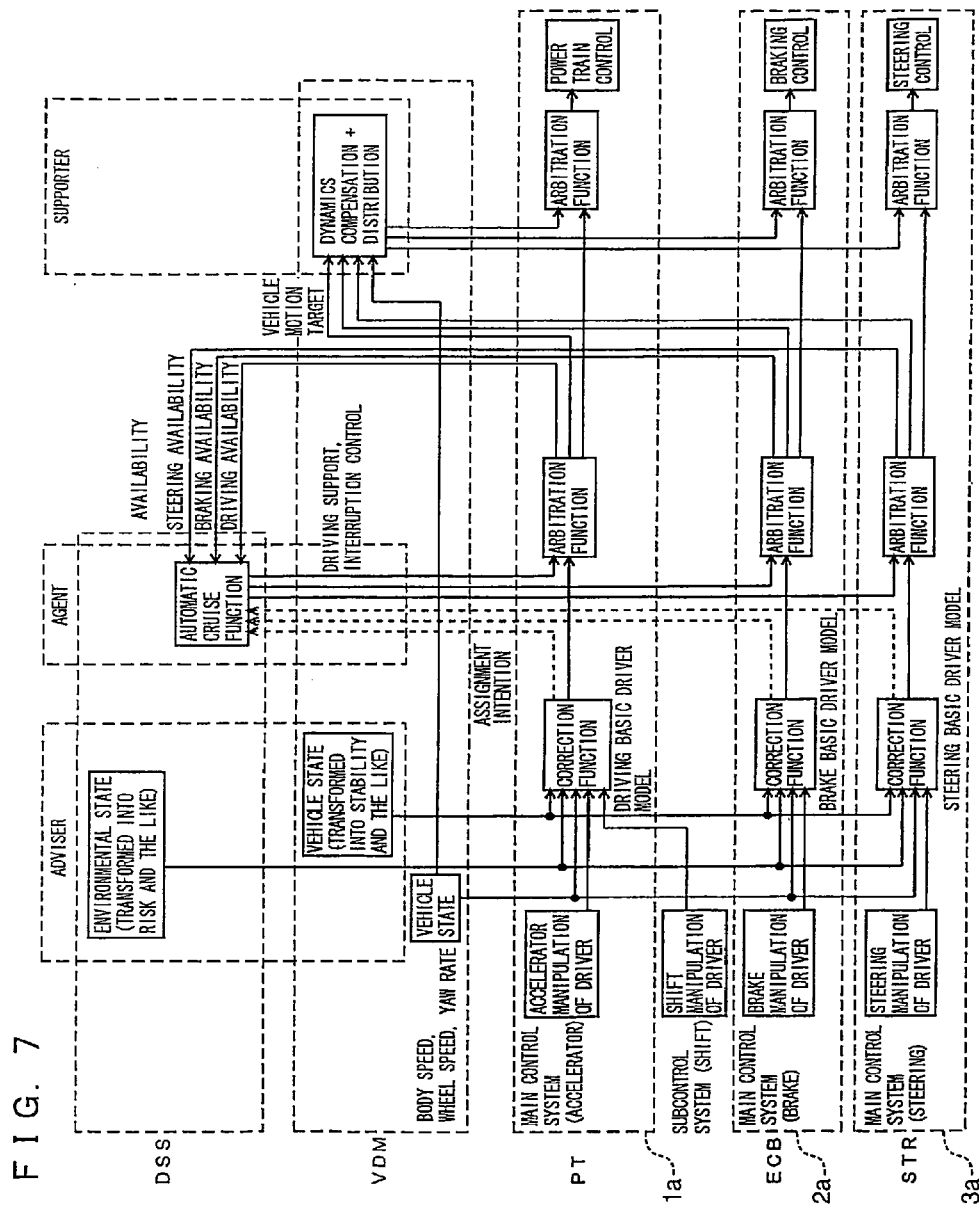
FIGS. 7-10 are schematic diagrams of a configuration of a vehicle integrated control system according to modifications of the present embodiment.

Referring to FIG. 7 corresponding to the first modification, a distribution functional unit of main control system 1a and main control system 2a are gathered to be disposed in the supporter unit. Therefore, the supporter unit executes the dynamic compensation function and distribution function together.

Figure 8:
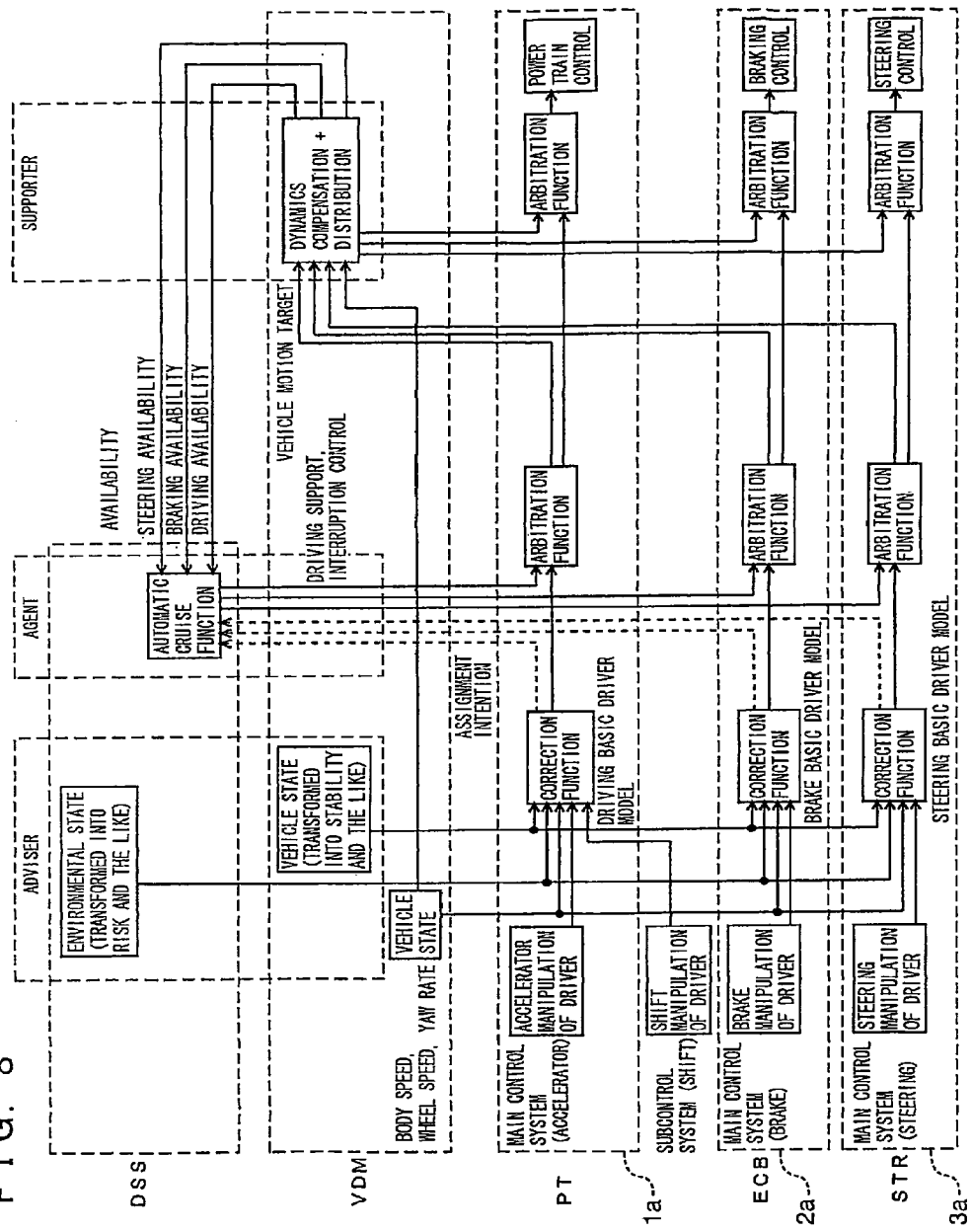

Referring to FIG. 8 corresponding to a second modification, availability is output from the supporter unit, in addition to the aggregated disposition of the supporter unit of main control system 1a and main control system 2a, likewise the first modification. Therefore, the supporter unit executes the dynamics compensation function and distribution function together, and the driving availability, braking availability and steering availability are output to the agent unit.

Figure 9:
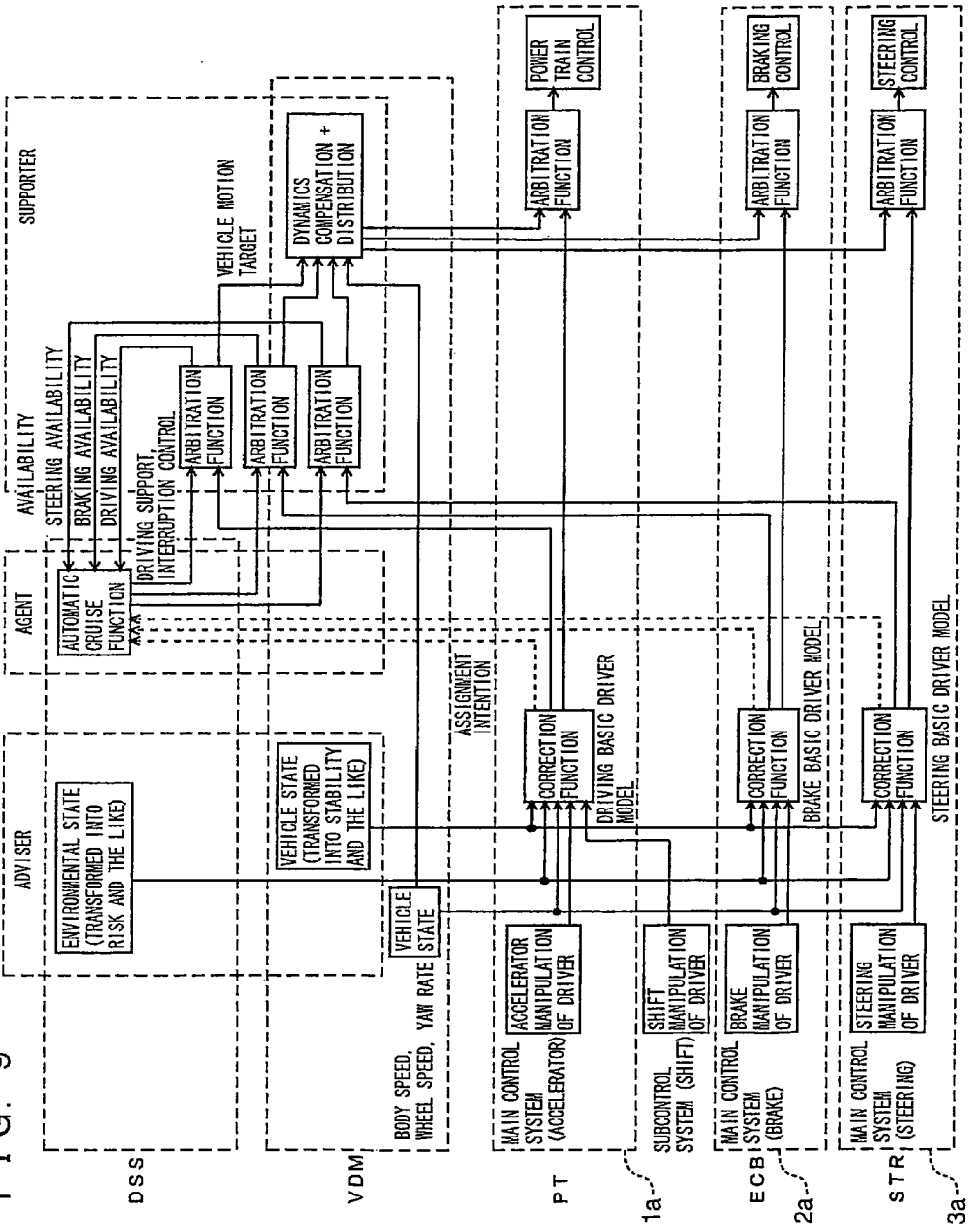

Referring to FIG. 9 corresponding to a third modification, the arbitration function of main control system 1a and main control system 2a is gathered at the supporter unit, in addition to providing the availability to the agent function. Furthermore, the arbitration function is gathered at the supporter unit. Therefore, at the supporter unit, the dynamics compensation function and distribution function are executed together, and the drive availability, braking availability and steering availability are provided to the agent unit to implement the arbitration function.

Figure 10:
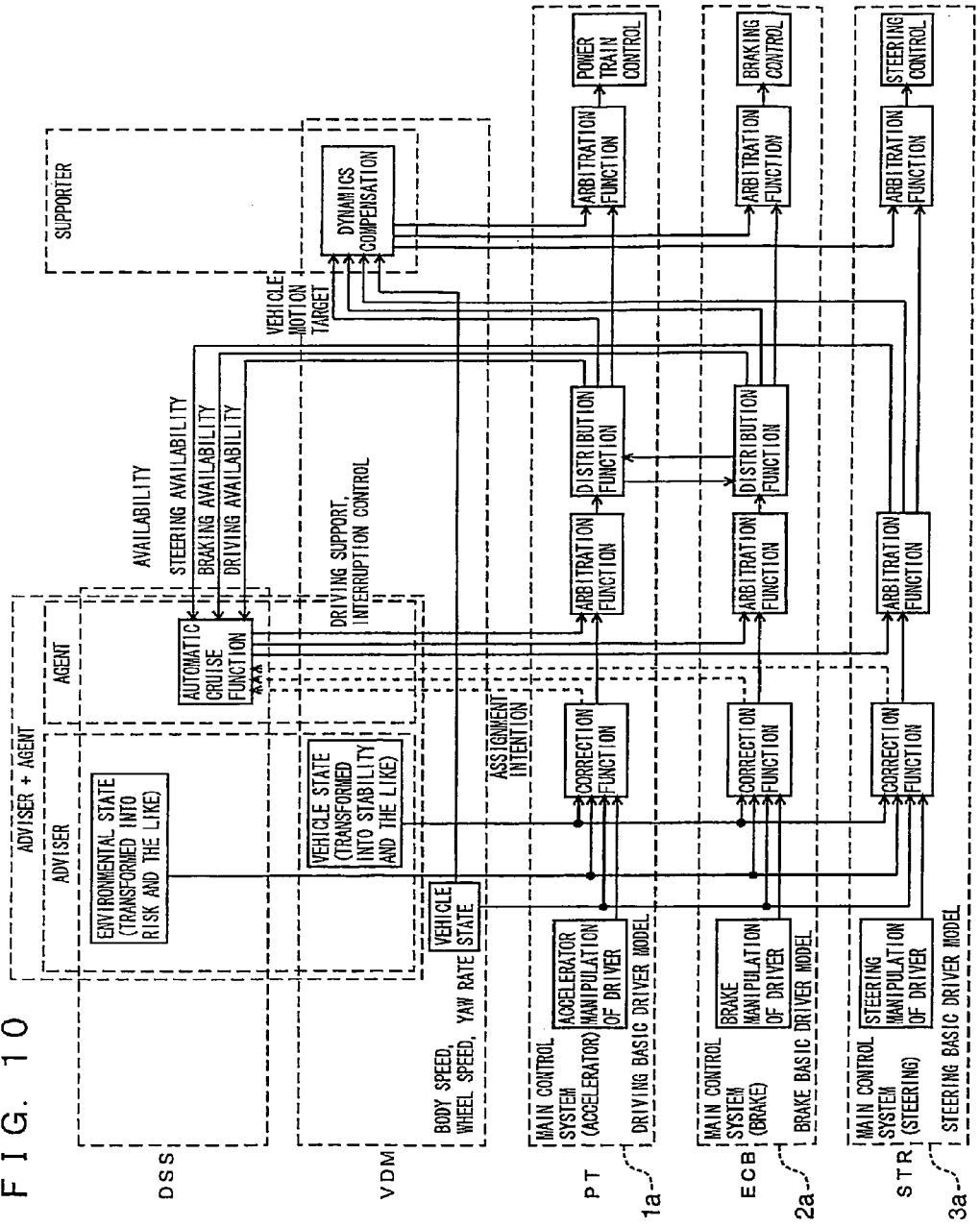

Referring to FIG. 10 corresponding to a fourth modification, the adviser unit and agent unit of the embodiment shown in FIG. 2 are assembled into one unit. Therefore, the adviser and agent unit can execute the adviser function and agent function together.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A vehicle integrated control system comprising:
a plurality of control units operating autonomously for controlling a running state of a vehicle based on a manipulation request, the plurality of control units comprising at least a driving system control unit that controls an acceleration of the vehicle and a brake system control unit that controls a stopping of the vehicle,
wherein each said driving system control unit and said brake system control unit comprises:
a sensing unit for sensing an operation request with respect to at least one control unit, and
a controller for controlling said vehicle by generating a control target based on a sensed request, and manipulating an actuator set in correspondence with each said control unit, using said control target; and
a plurality of processing units operating autonomously from each other and each processing unit operating parallel to each said control unit for generating and providing to each said control unit information to be used to modify said operation request or said control target, as necessary, at each said control unit,
wherein said plurality of processing units generate information processed such that said sensed request is shared among each said control unit, and
at least one of said plurality of processing units comprise an automatic cruising sub-unit generating the information processed so as to be shared among said driving system control unit and said brake system control unit based on the information for implementation of automatic cruising or pseudo-automatic cruising of said vehicle.

2. The vehicle integrated control system according to claim 1, wherein said plurality of processing units comprise:
a first sensing sub-unit for sensing environmental information around said vehicle,
a second sensing sub-unit for sensing information related to a driver of said vehicle, and
a processing sub-unit generating information processed such that said sensed information is shared among each of said control unit.

3. The vehicle integrated control system according to claim 2, wherein said processing sub-unit generates information representing a degree of correction with respect to a request of said driver at each said control unit.

4. The vehicle integrated control system according to claim 1, wherein said plurality of processing units comprise a processing sub-unit generating information processed so as to be shared among each said control unit based on information for implementation of said automatic cruising or said pseudo-automatic cruising of said vehicle.

5. The vehicle integrated control system according to claim 4, wherein said processing sub-unit generates information representing a degree of arbitration with respect to said control target at each said control unit.

6. The vehicle integrated control system according to claim 1, wherein said plurality of processing units comprise a processing sub-unit generating information processed so as to be shared among each said control unit to realize a behavior of the vehicle consistent with a control target, based on a current dynamic state of the vehicle.

7. The vehicle integrated control system according to claim 6, wherein said processing sub-unit generates information representing a degree of arbitration with respect to said control target at each said control unit.

8. The vehicle integrated control system according to claim 1, wherein each said control unit comprises said driving system control unit and said brake system control unit,
wherein said driving system control unit and said brake system control unit have a driving force and a braking force distributed with respect to a requested driving force so as to realize a desired behavior of the vehicle in co-operation.

9. The vehicle integrated control system according to claim 1, wherein each said control unit provides control such that reflection of information from said processing unit is rejected.

10. The vehicle integrated control system according to claim 1, wherein each said control unit is realized by each ECU, and operation is executed at said each ECU from an upper control hierarchy corresponding to a request of a driver towards a lower control hierarchy corresponding to each said actuator.

11. The vehicle integrated control system according to claim 1, wherein
said driving system control unit is realized by a first ECU,
said brake system control unit is realized by a second ECU,
a steering system control unit is realized by a third ECU,
operation is executed from an upper control hierarchy corresponding to a request of a driver towards a lower control hierarchy corresponding to each said actuator at each said first, second and third ECU,
said processing unit is realized by a fourth ECU differing from said first, second and third ECUs,
said first, second and third ECUs have an operation controlled in parallel, and
said fourth ECU is connected to an upper control hierarchy side of said first, second and third ECUs via an interface.

12. A vehicle integrated control system comprises a plurality of control units operating autonomously for controlling a running state of a vehicle based on a manipulation request, the plurality of control units comprising at least a driving system control unit that controls an acceleration of the vehicle and a brake system control unit that controls a stopping of the vehicle,
- wherein each said driving system control unit and said brake system control unit comprises:
  - a sensor configured to sense an operation request with respect to at least one control unit, and
  - a controller configured to control said vehicle by generating a control target based on a sensed request, and manipulating an actuator set in correspondence with each said control unit, using said control target,
- said system further comprising:
  - a plurality of processing units operating autonomously from each other and each processing unit operating parallel to each said control unit for generating and providing to each said control unit information to be used to modify said operation request or said control target, as necessary, at each said control unit,
- wherein said plurality of processing units generate information processed such that said sensed request is shared among each said control unit, and
- said plurality of processing units comprise an automatic cruising sub-unit generating the information processed so as to be shared among said driving system control unit and said brake system control unit based on the information for implementation of automatic cruising or pseudo-automatic cruising of said vehicle.

13. The vehicle integrated control system according to claim 12, wherein said plurality of processing units comprise:
- a second sensor configured to sense environmental information around said vehicle,
- a third sensor configured to sense information related to a driver of said vehicle, and
- a processor configured to generate information processed such that said sensed information is shared among each said control unit.

14. The vehicle integrated control system according to claim 13, wherein said processor includes a second processor configured to generate information representing a degree of correction with respect to a request of said driver at each said control unit.

15. The vehicle integrated control system according to claim 12, wherein said plurality of processing units comprise a processor configured to generate information processed so as to be shared among each said control unit, based on information for implementation of said automatic cruising or said pseudo-automatic cruising of said vehicle.

16. The vehicle integrated control system according to claim 15, wherein said processor includes a second processor configured to generate information representing a degree of arbitration with respect to said control target at each said control unit.

17. The vehicle integrated control system according to claim 12, wherein said plurality of processing units comprise a second processor configured to generate information processed so as to be shared among each said control unit to realize a behavior of the vehicle consistent with a control target, based on a current dynamic state of said vehicle.

18. The vehicle integrated control system according to claim 17, wherein said second processor includes a third processor configured to generate information representing a degree of arbitration with respect to said control target at each said control unit.

19. The vehicle integrated control system according to claim 12,
- wherein said driving system control unit and said brake system control unit have a driving force and a braking force distributed with respect to a requested driving force so as to realize a desired behavior of the vehicle in co-operation.

20. The vehicle integrated control system according to claim 12, wherein each said control unit further includes a controller configured to control such that reflection of information from said processing means is rejected.

21. The vehicle integrated control system according to claim 12, wherein each said control unit is realized by each ECU, and operation is executed at each said ECU from an upper control hierarchy corresponding to a request of a driver towards a lower control hierarchy corresponding to each actuator.

22. The vehicle integrated control system according to claim 12, wherein
- said driving system control unit is realized by a first ECU,
- said brake system control unit is realized by a second ECU,
- a steering system control unit is realized by a third ECU,
- operation is executed from an upper control hierarchy corresponding to a request of a driver towards a lower control hierarchy corresponding to each said actuator at each said first, second and third ECU,
- said processing unit is realized by a fourth ECU differing from said first, second and third ECUs,
- said first, second and third ECUs have an operation controlled in parallel, and
- said fourth ECU is connected to an upper control hierarchy side of said first, second and third ECUs via an interface.

23. The vehicle integrated control system according to claim 1,
- the plurality of control units further comprising a steering system control unit that controls a turning of the vehicle;
- wherein said steering system control unit comprises:
  - a sensing unit for sensing an operation request with respect to at least one control unit, and
  - a controller for controlling said vehicle by generating a control target based on a sensed request, and manipulating an actuator set in correspondence with each said control unit, using said control target; and
- wherein the automatic cruising sub-unit generates the information processed so as to be shared among said driving system control unit, said brake system control unit and said steering system control unit based on the information for implementation of said automatic cruising or said pseudo-automatic cruising of said vehicle.

24. The vehicle integrated control system according to claim 12,
- the plurality of control units further comprising a steering system control unit that controls a turning of the vehicle;
- wherein said steering system control unit comprises:
  - a sensing unit for sensing an operation request with respect to at least one control unit, and
  - a controller for controlling said vehicle by generating a control target based on a sensed request, and manipulating an actuator set in correspondence with each said control unit, using said control target; and
- wherein the automatic cruising sub-unit generates the information processed so as to be shared among said driving system control unit, said brake system control unit and said steering system control unit based on the information for implementation of said automatic cruising or said pseudo-automatic cruising of said vehicle.

* * * * *